United States Patent [19]

Hauk

[11] Patent Number: 4,995,904
[45] Date of Patent: Feb. 26, 1991

[54] METHOD FOR THE PRETREATMENT OF A LUMPY CARBON CARRIER

[75] Inventor: Rolf Hauk, Düsseldorf, Fed. Rep. of Germany

[73] Assignee: Deutsche Voest-Alpine Industrieanlagenbau GmbH, Duesseldorf, Fed. Rep. of Germany

[21] Appl. No.: 266,088

[22] Filed: Nov. 2, 1988

[30] Foreign Application Priority Data

Nov. 3, 1987 [DE] Fed. Rep. of Germany ....... 3737262

[51] Int. Cl.$^5$ ............................................. C21B 11/00
[52] U.S. Cl. ....................................... 75/445; 75/448; 75/450; 266/160; 266/172
[58] Field of Search ............... 75/38, 26, 40; 266/160, 266/172

[56] References Cited

U.S. PATENT DOCUMENTS

| 4,007,034 | 2/1977 | Hartwig et al. | 75/38 |
| 4,678,508 | 7/1987 | Saeki et al. | 266/160 |
| 4,701,214 | 10/1987 | Kaneko et al. | 266/160 |
| 4,734,165 | 3/1988 | Bauer et al. | 201/44 |
| 4,805,880 | 2/1989 | Hauk | 266/160 |

FOREIGN PATENT DOCUMENTS 3345106 7/1984 Fed. Rep. of Germany .
3530240 5/1986 Fed. Rep. of Germany .
3614757 11/1987 Fed. Rep. of Germany .

*Primary Examiner*—Melvyn J. Andrews
*Attorney, Agent, or Firm*—Barnes & Thornburg

[57] ABSTRACT

A method is disclosed for pretreatment of a lumpy carbon carrier suitable for forming a fluidized bed and a solid bed used in the production of pig iron from iron ore. The ore is pre-reduced in at least one reduction plant and the thus produced iron sponge is subsequently final reduced and fused in a melt-down gasifier with the help of the lumpy carbon carrier and an oxygen-containing gas and is the carbon carrier is fed into the upper part and the oxygen-containing gas is fed into the lower part of the melt-down gasifier. These materials form, together with the iron sponge, a fluidized bed in the melt-down gasifier. Below the fluidized bed, a solid bed is formed consisting of said lumpy carbon carrier. A suitable carbon carrier may be formed by pretreating available coal by one of two methods. Lumpy coal tending to burst upon subjection to a shock-like thermal load is preheated for a minimum of one hour at a temperature of at least 300° C. prior to being fed into the melt-down gasifier in order to diminish its bursting tendency and to reduce the thermal load to which it is subjected. Ground fine coal is blended with a binder and granulated into lumps.

7 Claims, 1 Drawing Sheet

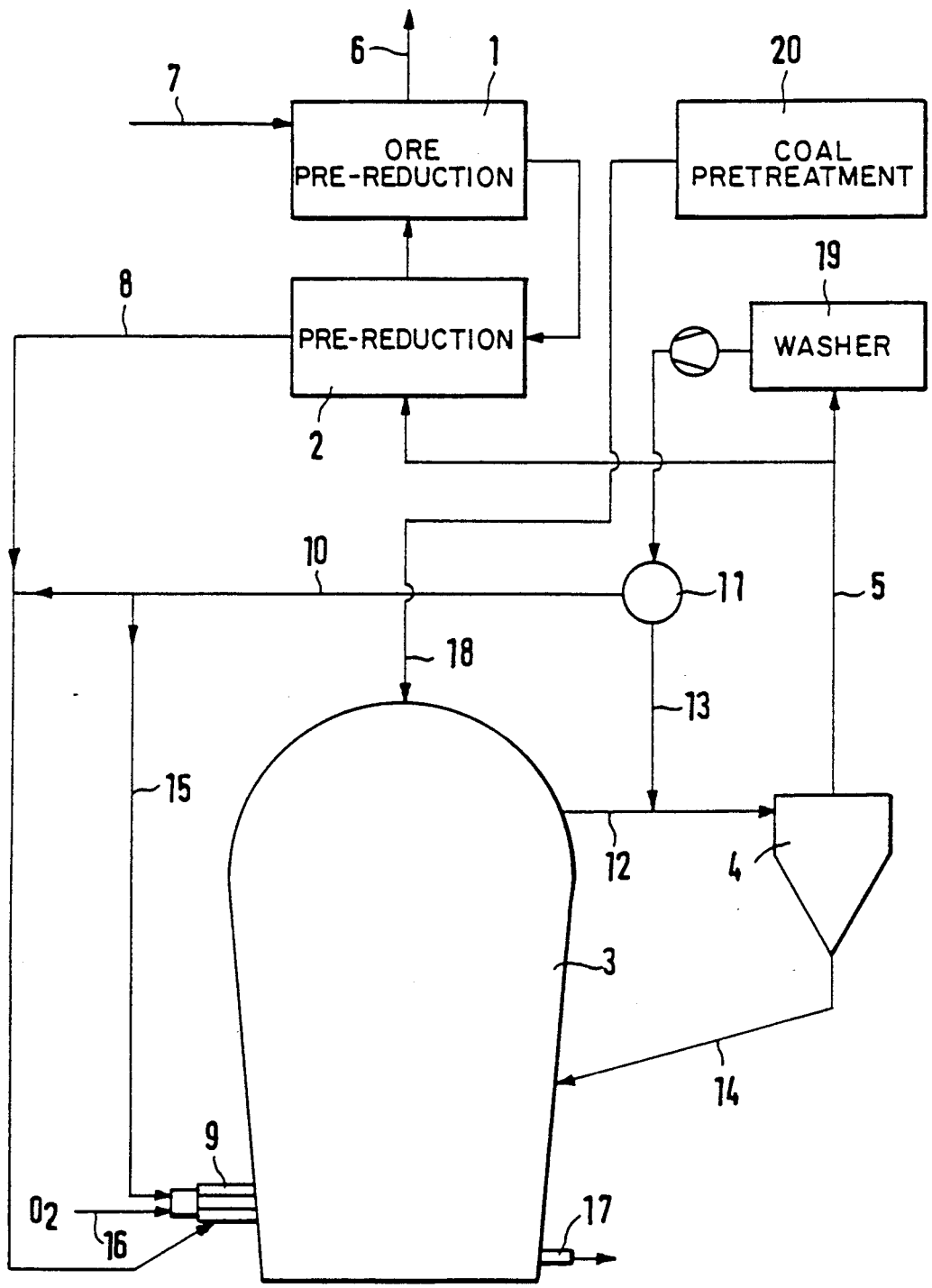

METHOD FOR THE PRETREATMENT OF A LUMPY CARBON CARRIER

BACKGROUND OF THE INVENTION

Fine coal and coal tending to burst upon subjection to heavy thermal loads cannot be used effectively as a carbon carrying reduction agent in a process in which pig iron is produced from iron ore wherein a fluidized bed is formed in a melt-down gasifier. Pre-treatment of lumpy coal tending to burst or of fine coal by one of the two methods described herein, however, permits the effective employment of most grades of coal and of fine coal as lumpy carbon carriers.

To produce pig iron from iron ore, the ore is first pre-reduced in at least one reduction step to form sponge iron. The sponge iron is then transported into a melt-down gasifier. To aid the subsequent final reducing and melting of the sponge iron, a lumpy carbon carrying reduction agent is introduced into the upper portion of the gasifier to form, together with the sponge iron, a fluidized bed and a solid bed of carbon carrier underneath the fluidized bed.

This reduction agent consists preferably of coal, in particular long-flame gas coal with a grain size of up to 50 mm, which has been dried degassed and subsequently converted into coke in the upper area of the melt-down gasifier. Therefore, a fluidized bed of coke is produced in the melt-down gasifier.

The formation of an optimum fluidized bed required for the melting and final reducing, and of a solid bed forming underneath the fluidized bed depends on the grain distribution of the coke particles produced in the meltdown gasifier. Many grades of coal tend to burst more or less violently when being fed into the head area of the gasifier due to the shock-like thermal load they are subjected to when brought into the there prevailing temperature of approximately 1,000° C., alterating the grain distribution accordingly.

Alternatively, the available coal may not have a sufficient grain size. The production of fine coal having a grain size of less than 1 mm constitutes approximately 30% of all coal produced by underground mining and this percentage is expected to increase further due to mining methods and preparation plants. Such fine coals, as well as coarse-grain coals tending to burst easily, are therefore less suitable for use in a melt-down gasifier working with a fluidized bed.

It is therefore the object of the present invention to provide a method for pretreating coals tending to burst or fine coals so as to form a lumpy carbon carrier suitable for the formation of a fluidized bed and a solid bed in a melt-down gasifier. The lumpy carbon carrier thus formed is used in a production of pig iron from iron ore wherein the ore is prereduced in one or in a plurality of reduction plants to iron sponge, and the iron sponge is subsequently fused and finally reduced in the melt-down gasifier with the help of the lumpy carbon carrier and an oxygen-containing gas. The lumpy carbon carrier is fed into the upper part of the melt-down gasifier and the oxygen-containing gas if fed into the lower part of the melt-down gasifier forming within the melt-down gasifier a fluidized bed with a solid bed of the lumpy carbon carrier being formed underneath the fluidized bed.

SUMMARY OF THE INVENTION

To produce pig iron from iron ore, the ore is first pre-reduced in at least one reduction step to form sponge iron. The sponge iron is then transported into a melt-down gasifier. Next, a pretreated lump carbon carrier is introduced into the upper portion of the gasifier, forming, together with the sponge iron, a fluidized bed and a solid bed of carbon carrier underneath the fluidized bed. An oxygen-containing gas is then introduced into the lower part of the gasifier and, with the aid of the lump carbon carrier, the sponge iron is finally reduced and melted.

Coarse-grain coal having a tendency to burst upon subjection to shock-like thermal loads is pretreated by preheating the coal at a minimum of 300° C. for at least one hour, the pre-heating step occurring separate from the pre-reducing step. The coal may be pre-oxidized by means of air heated to a temperature within a range of 300° to 500° C. Alternatively, this step may comprise steadily increasing the temperature of the coal within a range of 400° to 850° C. for a period of one to four hours. This step also comprises simultaneously drying the coal by means of steam.

Due to the fact that lumpy coal is preheated to produced a lumpy carbon carrier suitable for the formation of a fluidized bed nearly any grade of coal may be used as a carbon carrying reduction agent with process described herein for the production of pig iron from iron ore. The may have the effect that the bursting tendency of the coal is diminished and that the thermal load to which the coal on feeding it into the melt-down gasifier is reduced.

Alternatively fine coal having a grain size of less than 1 mm is preheated by a abstract method in which the coal is at first ground and then blended with a suitable binder in order to obtain a mechanically stable granulated material. The lump size of this granulated material approximately 10 mm. The binder is selected from a class consisting of lime, molasses, pitch, tar and mixtures thereof. A lumpy carbon carrier suitable for the formation of a fluidized bed is thus produced.

BRIEF DESCRIPTION OF THE DRAWING

The method for the production of pig iron from iron ore discussed herein, whereby coarse-grain coal tending to burst and fine coal are treated prior to their introduction into the melt-down gasifier is described in the following in further details taking reference to an embodiment represented in the FIGURE. This FIGURE shows a schematic representation of a plant for producing melted pig iron from fine ore.

DESCRIPTION OF THE PREFERRED EMBODIMENT

The represented plant contains, as essential component parts, two pre-reduction plants 1 and 2 and a melt-down gasifier 3. The pre-reduction is carried out by means of a gas which is produced in the melt-down gasifier in a manner yet to be described in detail, cooled down to 850° C. and purified in a cyclone 4. This gas containing substantially CO and $H_2$ flows from the cyclone 4 through a line 5 at first through the pre-reduction plant 2 and subsequently through the pre-reduction plant 1, and is then withdrawn as exhaust gas through a line 6. The fine ore is added through a line 7 and moves in countercurrent to the reducing gas at first through plant 1 and then through plant 2 in order to be withdrawn then from plant 2 through a line 8. The pre-reduction is carried out in fluidized beds, in reduction cyclones or in circulating fluidized beds.

The pre-reduced fine ore or the iron sponge are led though line 8 to plasma burners 9 provided in the lower segment of the melt-down gasifier 3. The transport of the iron sponge is carried out by means of a gas fed into line 8 through a line 10. The line 10 is connected with a collecting line 11 which holds gas which was taken out of the cyclone 4, cooled in the washer 19 and subsequently compressed. The gas produced in the melt-down gasifier 3 is led directly to the cyclone 4 through a line 12, is de-dusted there and is fed into the pre-reduction plants 1 and 2 through the line 5 as reduction gas. Since the gas leaves the melt-down gasifier 3 at a temperature of approximately 1000° C., the pre-reduction is carried out preferably at a temperature of 850° C., cool gas coming from the washer 19 is fed into the line 12 through a line 13 from the collecting line 11, so that the gas arriving at the cyclone 4 has the desired temperature of 850° C. The dust separated from the gas in the cyclone 4 is recycled into the melting and reduction area of the melt-down gasifier 3 through a line 14.

The plasma burners are equally spaced at the same height around the perimeter of the melt-down gasifier 3. One plasma burner may be used if it will furnish sufficient heat energy. A cooled gas from the washer 19 is used as plasma gas, which is led from the collecting line 11 via the line 10 and a line 15 branching off line 10 to the plasma burner 9. Also, exhaust gas withdrawn through line 6 and cooled may be used as plasma gas. Oxygen is led to the plasma burners 9 through a line 16 and is fed into the melt-down gasifier 3 through line 16. The oxygen may, however, also be blown into the melt-down gasifier 3 through nozzles which are separated from the plasma burners 9. The iron melt and the slags collecting at the bottom of the melt-down gasifier 3 are tapped off in given intervals through one or two tap-off lines 17.

A lumpy carbon carrier having a graininess of preferably 0 to 50 mm is fed from the top into the melt-down gasifier 3 through a line 18. This carbon carrier consists either of lumpy coal of any grade, the desired graininess of which is obtained by sifting, or which is pretreated so that it will not burst on entering the melt-down gasifier 3, or of fine coal which is ground, blended with a binder, and subsequently granulated to lump sizes of approximately 10 mm. Line 18 is connected with a respective pretreatment plant 20. Such plant is provided either for a suitable thermal treatment of coarse grain coal tending to burst, or comprises a grinding station, a blending station and a granulating station for fine-grain coal. In the blending station, the binder is added which consists of lime, molasses, pitch and/or tar.

The thermal treatment of the coal in the pretreatment station 20 may comprise preheating coarse-grain coal tendency to burst at slowly increasing temperatures in range of 400° to 850° C. within a period of time of approximately 1 to 4 hours. Thereby the coal is partly dried and degassed and the difference with respect to the temperature prevailing in the gasifier head is remarkably reduced so that the danger of bursting of the coal at the subsequent entry into the melt-down gasifier 3 is excluded. An increased drying may be achieved due to the effect of steam during such pretreatment. The thermal treatment may also be carried out by pre-oxidizing the coal by means of hot air in a temperature range of 350° to 500° C.

The coal falls quickly through the free head area of the gasifier during which time it is completely dried and degassed. The thus produced coke falls upon a coke layer which is kept in a condition similar to a fluidized bed. The fluidized bed or turbulent layer is maintained by the up-flowing plasma gas and oxygen and CO produced during the final reduction of the iron sponge. The gas collecting above the fluidized bed consists substantially of CO and $H_2$ and has a temperature of approximately 100° C. It is withdrawn through the line 12.

The iron sponge fuses in the effective zone of the plasma burners 9 and is totally reduced by the coke present there. The thus produced liquid iron and also the liquid slags drip down and collect on the bottom of the melt-down gasifier 3. A fluidized bed height suitable for an economic operation is between one and five meters.

The coal supplied through the line 18 may be of any quality. For example, a cheap long-flame gas coal of the following composition may be used: 5% wet, 35.7% volatile substances, 76.6% C, 5.3% H, 8.6% O, 1.6% N, 7.3% cinders; the calorific power is 30,870 kJ/kg (all values referring to a water-free condition). If, on using such coal, no additional energy would be adduced through the plasma burners 9, the introduced iron sponge should have to be pre-reduced to a metallization degree of 90% for operating the melt-down gasifier 3. Additionally, the coal and oxygen consumption would be relatively high. Furthermore, a reduction of fine ore in the fluidized bed would not be convenient on account of the appearing agglomerations.

However, the inventive method may principally be carried out also without the use of plasma burners, in particular, if iron ore in lump for or in the form of pellets is used. The iron sponge produced therefrom in the pre-reduction phase will be likewise fed into the head area of the melt-down gasifier.

What is claimed is:

1. A process for producing pig iron from iron ore, comprising the steps of:
   a. pre-reducing iron ore in at least one reduction step to produce sponge iron,
   b. transporting the sponge iron into a melt-down gasifier,
   c. pre-treating fine coal having a grain size of less than 1 mm by granulating a mixture of ground fine coal and a binder into lumps to produce a lumpy carbon carrier suitable for the formation of a fluidized bed, the pre-treating step occurring separate from the pre-reducing step,
   d. introducing the pre-treated lumpy carbon carrier into the upper part of the melt-down gasifier to form, together with the sponge iron, a fluidized bed and a solid bed of carbon carrier underneath the fluidized bed, and
   e. introducing an oxygen-containing gas into the lower part of the melt-down gasifier for finally reducing and fusing the sponge iron with the aid of the lump carbon carrier.

2. The method according to claim 1, characterized in that the granulated fine coal has to lump size of approximately 10 mm.

3. The method as defined by claims 2 or 1 wherein the binder is selected from the group consisting of lime, molasses, pitch, tar and mixtures thereof.

4. A process for producing pig iron from iron ore, comprising the steps of:

a. pre-reducing iron ore in at least one reduction step to produce sponge iron, b. transporting the sponge iron into a melt-down gasifier, c. pre-heating at a temperature of between about 300° C. and 1000° C. for at least one hour lumpy coal having a tendency to burst upon subjection to shock-like thermal loads in order to diminish the busting tendency of the coal and to reduce the thermal load to which the coal is subjected upon introduction into the gasifier, thus producing a lumpy carbon carrier suitable for the formation of a fluidized bed, the pre-heating step occurring separate from the pre-reducing step, d. introducing the pre-treated lumpy carbon carrier into the upper part of the melt-down gasifier to form, together with the sponge iron, a fluidized bed and a solid bed of carbon carrier underneath the fluidized bed, and e. introducing an oxygen-containing gas into the lower part of the melt-down gasifier for finally reducing and fusing the sponge iron with the aid of the lump carbon carrier.

5. The process as defined in claim 4 wherein the pre-heating step comprises steadily increasing the temperature of said lumpy coal within a range of 400° to 850° C. for a period of one to four hours.

6. The method according to claim 4 wherein the pre-heating step comprises simultaneous drying by means of stem.

7. The method according to claim 4, wherein the preheating step comprises pre-oxidizing the lumpy coal by means of air heated to a temperature within a range of 300° to 500° C.

* * * * *